(12) United States Patent
Chen (10) Patent No.: US 9,113,716 B2
(45) Date of Patent: Aug. 25, 2015

(54) HEIGHT-ADJUSTABLE BACKREST ASSEMBLY

(71) Applicant: Bih-Yuan Chen, Tainan (TW)

(72) Inventor: Bih-Yuan Chen, Tainan (TW)

( * ) Notice: Subject to any disclaimer, the term of this patent is extended or adjusted under 35 U.S.C. 154(b) by 125 days.

(21) Appl. No.: 14/140,467

(22) Filed: Dec. 24, 2013

(65) Prior Publication Data

US 2015/0173517 A1 Jun. 25, 2015

(51) Int. Cl.
*B60N 2/02* (2006.01)
*A47C 7/40* (2006.01)
*A47C 1/024* (2006.01)
*B60N 2/30* (2006.01)

(52) U.S. Cl.
CPC ............... *A47C 7/402* (2013.01); *A47C 1/024* (2013.01); *B60N 2/3027* (2013.01)

(58) Field of Classification Search
USPC ...................... 297/353, 411.36, 410
See application file for complete search history.

(56) References Cited

U.S. PATENT DOCUMENTS

| | | | | |
|---|---|---|---|---|
| 4,639,039 A * | 1/1987 | Donovan | ................... | 297/353 |
| 5,649,741 A * | 7/1997 | Beggs | ................... | 297/353 |
| 5,695,249 A * | 12/1997 | Lotfi | ................... | 297/353 |
| 5,725,278 A * | 3/1998 | Verbeek | ................... | 297/353 |
| 5,735,577 A * | 4/1998 | Lin | ................... | 297/411.36 |
| 6,709,059 B1 * | 3/2004 | Cvek | ................... | 297/353 |
| 7,275,790 B2 * | 10/2007 | Chi | ................... | 297/353 |
| 2011/0012412 A1 * | 1/2011 | Hu | ................... | 297/353 |
| 2012/0193962 A1 * | 8/2012 | Chen | ................... | 297/353 |

* cited by examiner

*Primary Examiner* — David E Allred (57) ABSTRACT

A height-adjustable backrest assembly includes a connecting member an upper end mounted between a positioning board having vertically spaced positioning grooves and a backrest movable relative to the positioning board in a vertical direction. A lower end of the connecting member is coupled to a seat or a base. A positioning button is pivotably mounted to the connecting member and has a positioning section biased by a spring to releasably engage one of the positioning grooves. A transfer groove below the bottommost positioning groove receives the positioning button when the positioning section of the positioning button disengages from the positioning grooves. The positioning button abuts against an abutment member on the connecting member to limit the positioning section in a position not aligned with the positioning grooves. The abutment section disengages from the abutment member when an abutment protrusion of the positioning board presses against the positioning section.

6 Claims, 11 Drawing Sheets

HEIGHT-ADJUSTABLE BACKREST ASSEMBLY

BACKGROUND OF THE INVENTION

The present invention relates to a height-adjustable backrest assembly and, more particularly, to a height-adjustable backrest assembly with improved adjusting convenience and enhanced operational stability.

A backrest separate from a seat is generally connected by a connecting member to the seat. The connecting member is substantially L-shaped and includes a first end fixed to the backrest and a second end fixed to the seat or a base, mounting the backrest behind the seat. However, users having different heights lay against the backrest at different locations. Specifically, the backrest can not provide lying comfort for various users.

To mitigate the above disadvantage, height adjusting mechanisms have been proposed to allow the backrest to move upward/downward relative to the connecting member, and the backrest is then fixed by bolts after the height adjustment. However, such height adjusting mechanism are inconvenient to operate and can not reliably fix the backrest in place.

BRIEF SUMMARY OF THE INVENTION

An objective of the present invention is to provide a height-adjustable backrest assembly with improved adjusting convenience and enhanced operational stability.

A height-adjustable backrest assembly according to the present invention includes a backrest including a rear side having a coupling groove. The coupling groove includes an opening in a lower end thereof. A connecting member includes an upper end coupled to the backrest. The connecting member further includes a lower end adapted to be coupled to a seat or a base. The upper end of the connecting member is received in the coupling groove of the backrest. An abutment member is provided on a rear surface of the connecting member. The abutment member includes an end having an outer side. The abutment member includes a first inclined guiding face protruding from the outer side towards a center of the end of the abutment member. The end of the abutment member further includes a first stop face at a side thereof. The first inclined guiding face and the first stop face extend beyond the rear surface of the connecting member.

A positioning button is pivotably mounted to the rear surface of the connecting member. The positioning button includes an axle portion having an axle hole. A pivot extends through the axle hole and pivotably connected to the connecting member. A positioning section protrudes from the axle portion and includes a second inclined guiding face and a second stop face. The axle portion further includes a mounting section through which the axle hole extends. A spring includes first and second tangs and a coil portion between the first and second tangs. The coil portion is mounted to the mounting section of the positioning button. The pivot extends through the coil portion of the spring and is connected to the connecting member. The first tang abuts against the connecting member, and the second tang abuts against the positioning button.

A positioning board is mounted in a location outside of the coupling groove of the backrest. The connecting member is securely received in the coupling groove of the backrest and is securely sandwiched between the backrest and the positioning board. The positioning board includes a movement groove extending in a vertical direction. The movement groove includes a rectilinear side corresponding to the axle portion of the positioning button. The positioning board further includes a plurality of positioning grooves spaced from each other in the vertical direction. The positioning section of the positioning button is releasably engaged in one of the plurality of positioning grooves. Each of the plurality of positioning grooves includes an upper edge, a lower edge located below the upper edge in the vertical direction, and an inner edge between the upper edge and the lower edge. The spring biases the positioning button to pivot relative to the plurality of positioning grooves of the positioning board. The positioning section of the positioning button abuts the inner edge of one of the plurality of positioning grooves. An opening between the upper edge and the lower edge of each of the plurality of positioning grooves has a width larger than a width of the positioning section of the positioning button to provide room allowing movement of the positioning button. The positioning section of the positioning button abuts the lower edge of one of the plurality of positioning grooves when the backrest is moved to adjust a height of the backrest relative to the connecting member.

The bottommost positioning groove includes an extension extending from the lower edge thereof. The positioning board further includes a transfer groove formed below the bottommost positioning groove. The transfer groove receives the positioning button when the positioning section of the positioning button disengages from the plurality of positioning grooves. The transfer groove includes a first side connected to the rectilinear side of the movement groove. The transfer groove further includes a second side having a rectilinear guiding section connected to the extension of the bottommost positioning groove. The positioning section of the positioning button is guided by the rectilinear guiding section of the transfer groove while the positioning button is moving into the transfer groove. The second inclined guiding face of the positioning button slides along the first inclined guiding face of the abutment member. The second stop face of the positioning button abuts against the first stop face of the abutment member to limit the positioning section of the positioning button in a position not aligned with the plurality of positioning grooves. The movement groove further includes a top end having an abutment protrusion. The abutment section of the positioning button disengages from the abutment member when the abutment protrusion of the movement groove presses against a top end of the positioning section of the positioning button.

Preferably, the axle portion of the positioning button includes a ridge. The ridge presses against the rectilinear edge of the movement groove when the positioning section of the positioning button is received in one of the plurality of positioning grooves.

Preferably, the rear side of the backrest includes a recessed portion having two lateral walls, a bottom wall extending perpendicularly to and extending between the two lateral walls, and an upper wall extending perpendicularly to the bottom wall and the two lateral walls and extending between the two lateral walls. The coupling groove is defined in the bottom wall of the recessed portion, forming two ledges on opposite sides of the coupling groove. Each ledge has a plurality of fixing holes. The positioning board is received in the recessed portion of the backrest and has a plurality of fixing holes aligned with the plurality of fixing holes of the backrest. A plurality of fasteners extends through the plurality of fixing holes of the positioning board and the plurality of fixing holes of the backrest to securely fix the connecting member in the coupling groove of the backrest.

Preferably, each lateral wall of the recessed portion of the backrest includes a rib. The positioning board includes a notch in each of two lateral sides thereof. The ribs of the backrest are engaged in the notches of the positioning board.

Preferably, the pivot includes an enlarged head abutting the coil portion of the spring. An attachment peg is provided the rear surface of the connecting member and includes an enlarged section. The first tang of the spring abuts against the attachment peg of the connecting member. The enlarged section of the attachment peg prevents the first tang of the spring from disengaging from the attachment peg. The positioning section has an attachment block. The second tang of the spring abuts against the attachment block of the positioning button. The positioning board further includes a slot extending in the vertical direction. The slot receives the attachment peg.

Preferably, a lid is mounted to an outer side of the positioning board. The lid includes a plurality of mounting pegs received in a plurality of mounting holes in the positioning board.

The present invention will become clearer in light of the following detailed description of illustrative embodiments of this invention described in connection with the drawings.

DETAILED DESCRIPTION OF THE INVENTION

With reference to FIGS. 1-6, a height-adjustable backrest assembly according to the present invention includes a backrest 1, a connecting member 2, a positioning button 3, a spring 4, and a positioning board 5. The backrest 1 includes a rear side including a recessed portion 11 having two lateral walls 12, a bottom wall extending perpendicularly to and extending between the lateral walls 12, and an upper wall 13 extending perpendicularly to the bottom wall and the lateral walls 12 and extending between the lateral walls 12. A coupling groove 14 is defined in the bottom wall of the recessed portion 11 and has a width smaller than that of the recessed portion 11, forming two ledges 15 on opposite sides of the coupling groove 14. The coupling groove 14 includes an opening 141 in a lower end thereof. Each ledge 15 has a plurality of fixing holes 151. Each lateral wall 12 of the recessed portion 11 includes a rib 121.

Figure 1:
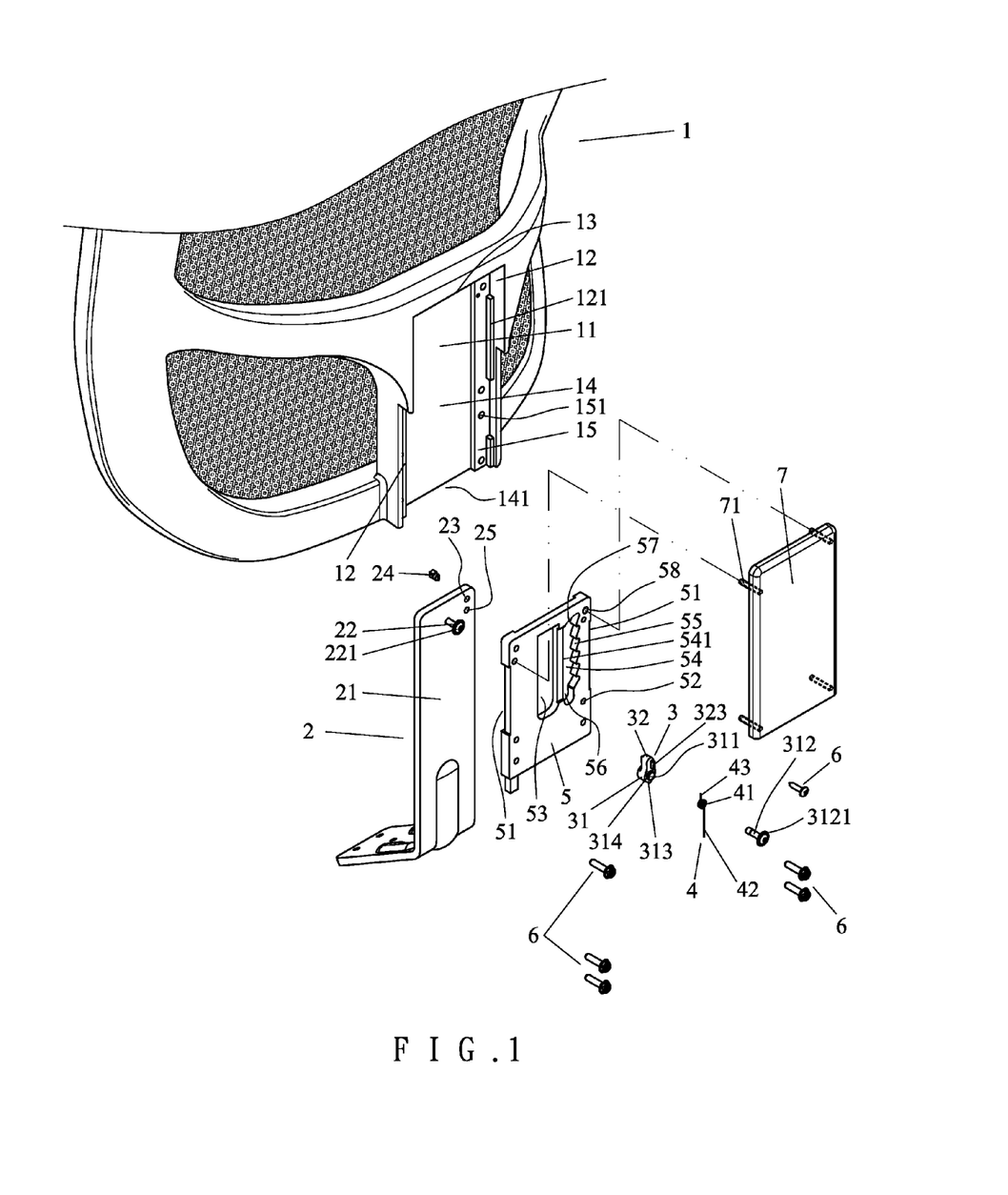
FIG. 1 is a partial, exploded, perspective view of a height-adjustable backrest assembly according to the present invention.
Figure 2:
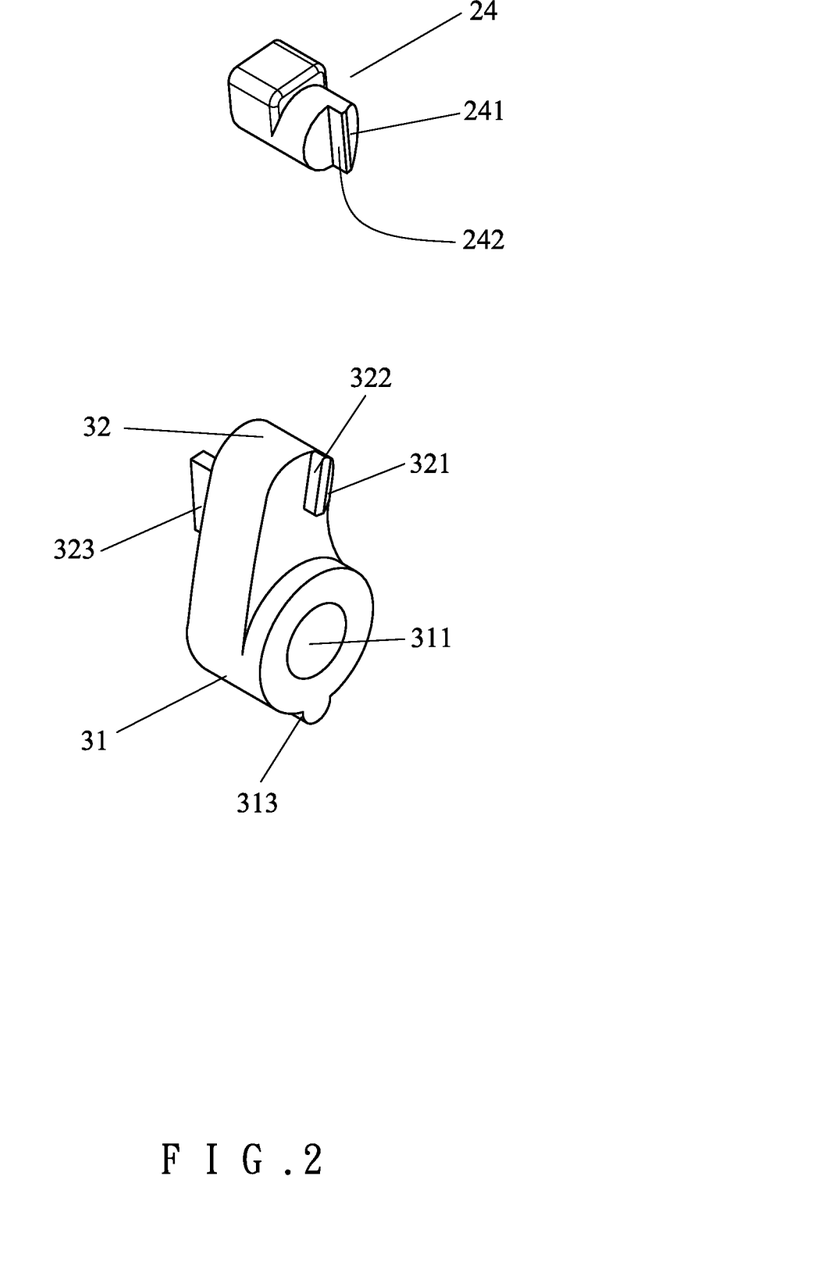
FIG. 2 is a perspective view of a positioning button and an attachment member of the height-adjustable backrest assembly of FIG. 1.

The connecting member 2 is a plate and includes an upper end coupled to the backrest 1. The connecting member 2 further includes a lower end adapted to be coupled to a seat (not shown) or a base (not shown). The upper end of the connecting member 2 is received in the coupling groove 14 of the backrest 1. The connecting member 2 further includes a rear surface 21. An attachment peg 22 is provided on the rear surface 21 of the connecting member 2 and includes an enlarged section 221. Furthermore, an abutment member 24 is mounted in a fixing hole 23 in the connecting member 2. The abutment member 24 is in the form of a column and includes an end having an outer side. The abutment member 24 includes a first inclined guiding face 241 protruding from the outer side towards a center of the end of the abutment member 24. The end of the abutment member 24 further includes a first stop face 242 at a side thereof. The attachment member 24 extends through the fixing hole 23 of the connecting member 2, with the first inclined guiding face 241 and the first stop face 242 extending beyond the rear surface 21 of the connecting member 2. The connecting member 2 further includes a mounting hole 25 below the fixing hole 23.

Figure 3:
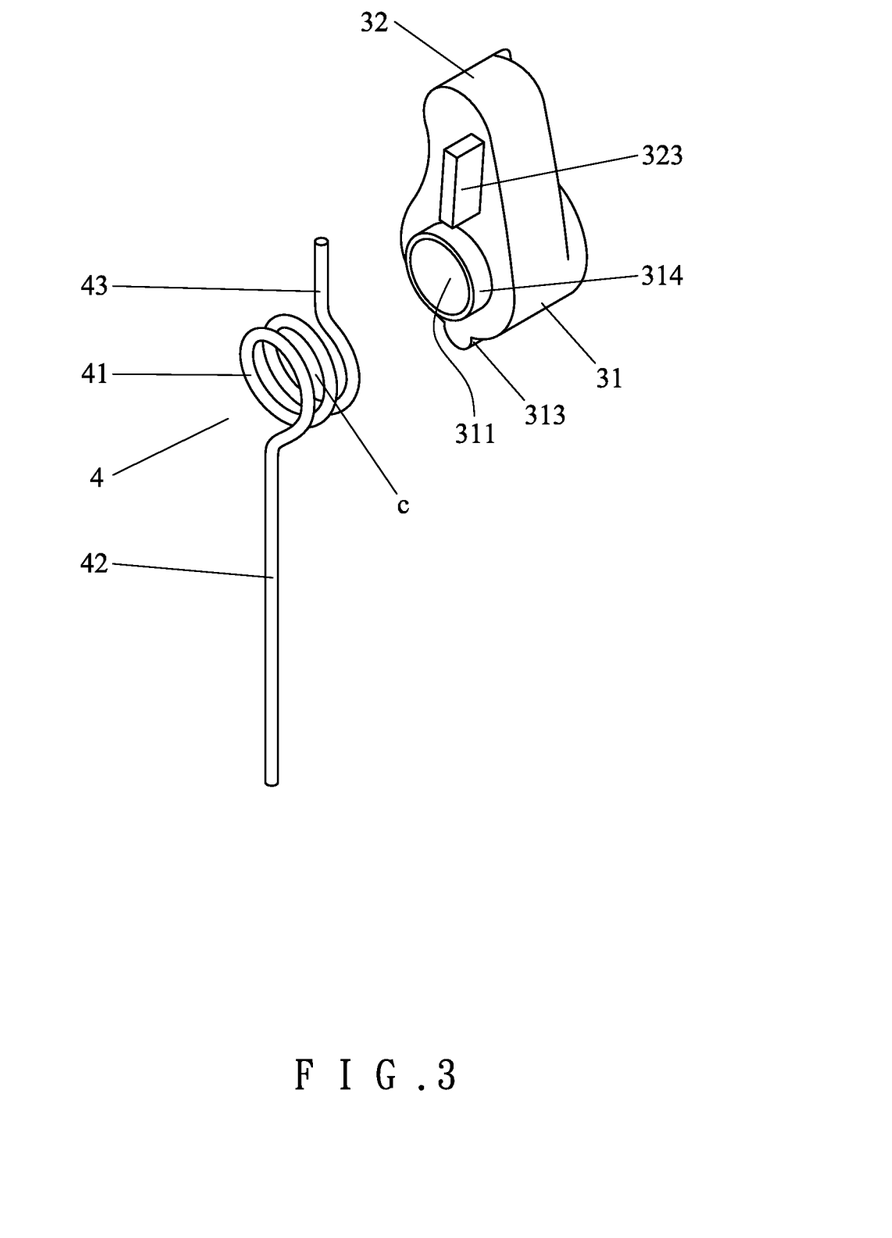
FIG. 3 is a perspective view of the positioning button and a spring.
Figure 4:
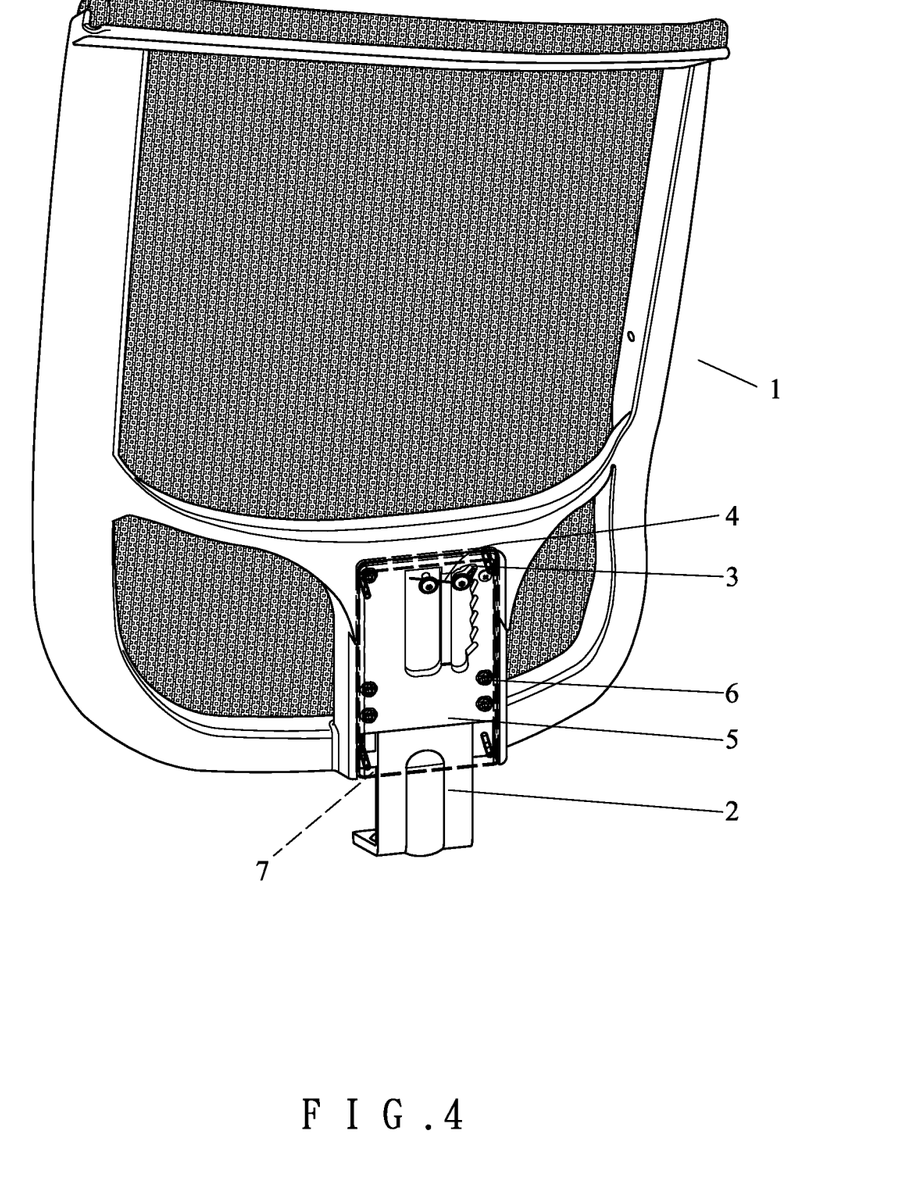
FIG. 4 is a perspective view of the height-adjustable backrest assembly of FIG. 1 after assemblage.

The positioning button 3 is pivotably mounted to the rear surface 21 of the connecting member 2. The positioning button 3 includes an axle portion 31 having an axle hole 311. A pivot 312 extends through the axle hole 311 and is pivotably received in the mounting hole 25 of the connecting member 2. The pivot 312 includes an enlarged head 3121. The axle portion 31 further includes a ridge 313. The axle portion 31 further includes a mounting section 314 through which the axle hole 311 extends. A positioning section 32 protrudes from the axle portion 31 and includes a rounded end. The positioning section 32 includes a second inclined guiding face 321 and a second stop face 322. The positioning section 32 further has an attachment block 323.

The spring 4 is in the form of a torsion spring and includes first and second tangs 42 and 43 and a coil portion 41 between the first and second tangs 42 and 43. The coil portion 41 is mounted to the mounting section 314 of the positioning button 3. The pivot 312 extends through the coil portion 41 of the spring 4 and is received in the mounting hole 25 of the connecting member 2, with the enlarged head 3121 of the pivot 312 abutting against the coil portion 41, with the first tang 42 abutting against the attachment peg 22 of the connecting member 2, and with the second tang 43 abutting against the attachment block 323 of the positioning button 3. The enlarged section 221 of the attachment peg 2 prevents the first tang 42 from disengaging from the attachment peg 22. The positioning button 3 is moved towards the connecting member 2 under the elasticity of the spring 4 and can pivot under the torsion of the spring 4. A spacing c between two adjacent turns of the coil portion 41 of the spring 4 allows movement of the positioning button 3.

The positioning board 5 is mounted in a location outside of the coupling groove 14 of the backrest 1. The positioning board 5 includes a notch 51 in each of two lateral sides thereof. The ribs 121 of the backrest 1 are engaged in the notches 51 of the positioning board 5 to increase assembling stability. The positioning board 5 has a plurality of fixing holes 52 aligned with the fixing holes 151 of the backrest 1. The positioning board 5 is received in the recessed portion 11 of the backrest 1, and fasteners 6 extend through the fixing holes 52 of the positioning board 5 and the fixing holes 151 of the backrest 1 to securely fix the connecting member 2 in the coupling groove 14 of the backrest 1. The positioning board 5 further includes a slot 53 extending in the vertical direction. The slot 53 receives the attachment peg 22.

Figure 5:
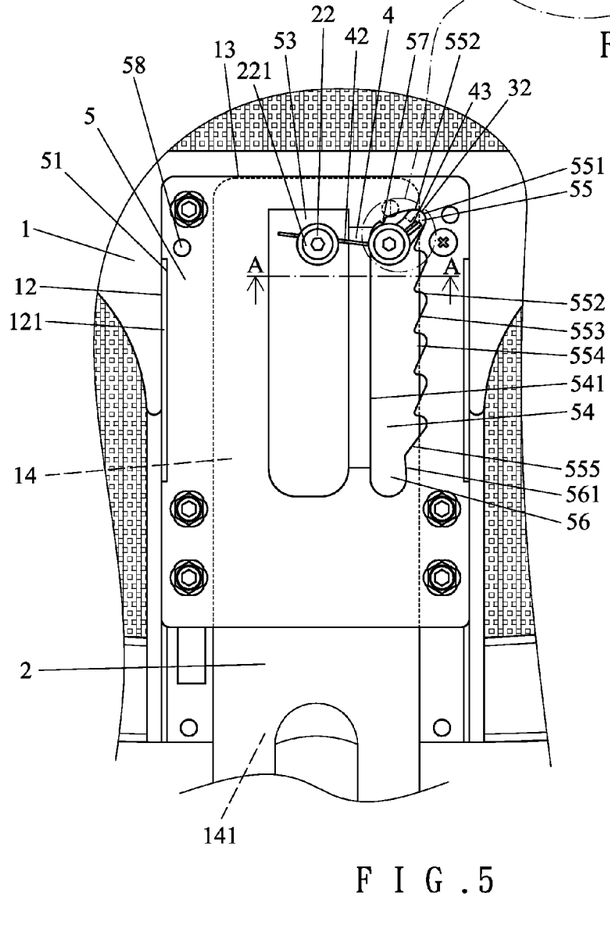
FIG. 5 is a cross sectional view of the height-adjustable backrest assembly of FIG. 4, with the backrest in the bottommost position.
Figure 5A:
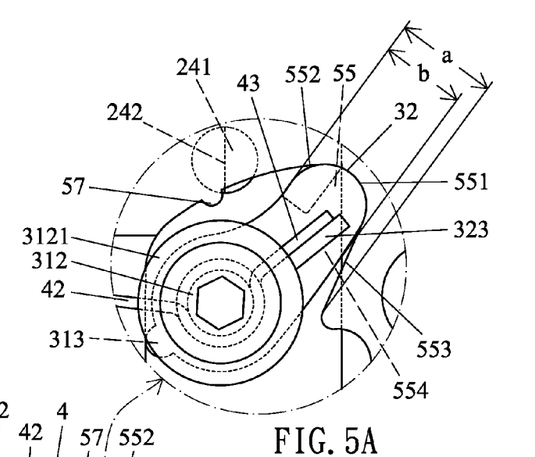
FIG. 5A is an enlarged view of a circled portion of FIG. 5.
Figure 6:
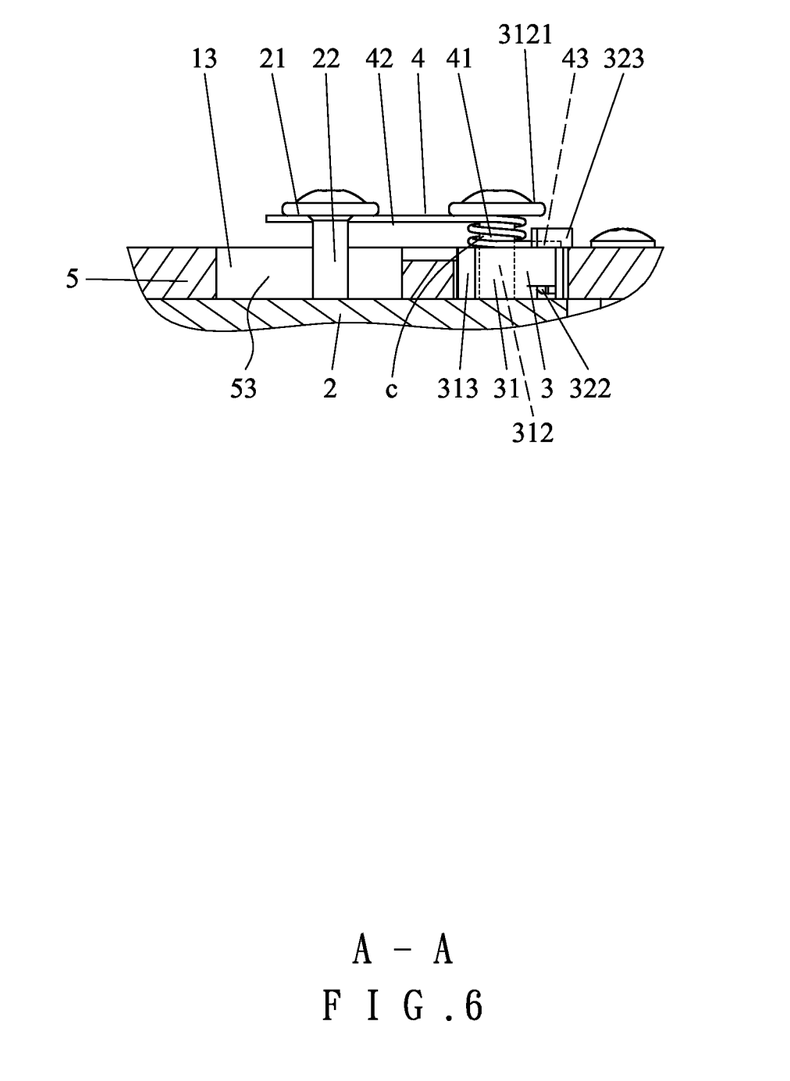
FIG. 6 is a cross sectional view taken along section line A-A of FIG. 5.

The positioning board 5 further includes a movement groove 54 extending in a vertical direction. The movement groove 54 includes a rectilinear side 541 corresponding to the axle portion 31 of the positioning button 3. The ridge 313 can press against the rectilinear edge 541 of the movement groove 54. The positioning board 5 further includes a plurality of positioning grooves 55 spaced from each other in the vertical direction. The positioning section 32 of the positioning button 3 is releasably engaged in one of the positioning grooves 55. Each positioning groove 55 includes an upper edge 552, a lower edge 553 located below the upper edge 552 in the vertical direction, and an inner edge 551 between the upper edge 552 and the lower edge 553. The inner edge 551 of each positioning groove 55 is arcuate. The positioning section 32 of the positioning button 3 abuts the inner edge 551 of one of the positioning grooves 55. The spring 4 biases the positioning button 3 to pivot relative to the positioning grooves 55 of the positioning board 5. With reference to FIG. 5, an opening 554 between the upper edge 552 and the lower edge 553 of each positioning groove 55 has a width a larger than a width b of the positioning section 32 of the positioning button 3 to provide room allowing movement of the positioning button 3. The lower edge 553 of an upper positioning groove 55 is connected to the upper edge 552 of a lower positioning groove 55. The positioning section 32 of the positioning button 3 abuts the lower edge 553 of one of the positioning grooves 55 when the backrest 1 is being moved to adjust a height of the backrest 1 relative to the connecting member 2.

The bottommost positioning groove 55 includes an extension 555 extending from the lower edge 553 thereof. The positioning board 5 further includes a transfer groove 56 formed below the bottommost positioning groove 55. The transfer groove 56 receives the positioning button 3 when the positioning section 32 of the positioning button 3 disengages from the positioning grooves 55. The transfer groove 56 includes a first side connected to the rectilinear side 541 of the movement groove 54. The transfer groove 56 further includes a second side having a rectilinear guiding section 561 connected to the extension 555 of the bottommost positioning groove 55. The positioning section 32 of the positioning button 3 is guided by the rectilinear guiding section 561 of the transfer groove 55 while the positioning button 3 is moving into the transfer groove 56, with the second inclined guiding face 321 of the positioning button 3 sliding along the first inclined guiding face 241 of the abutment member 24, and with the second stop face 322 of the positioning button 3 abutting against the first stop face 242 of the abutment member 24 to limit the positioning section 32 of the positioning button 3 in a position not aligned with the positioning grooves 55. The movement groove 54 further includes a top end having an abutment protrusion 57. The abutment protrusion 57 of the movement groove 54 can press against a top end of the positioning section 32 of the positioning button 3 to disengage the abutment section 32 of the positioning button 3 from the abutment member 24. The positioning board 5 further includes a plurality of mounting holes 58.

In assemblage, the attachment peg 22 and the attachment member 24 are mounted to the connecting member 2. The upper end of the connecting member 2 is received in the coupling groove 14 of the backrest 1. The positioning board 5 is fixed by the fasteners 6 to the ledges 15 of the backrest 1. Thus, the upper end of the connecting member 2 is enveloped by the backrest 1 and the positioning board 5 to provide an aesthetic appearance and assembling stability. The positioning button 3 and the spring 4 are mounted to the connecting member 2 by the pivot 312, with first and second tangs 42 and 43 to the spring 4 respectively abutting against the attachment peg 22 of the connecting member 2 and the attachment block 323 of the positioning button 3. The positioning button 3 is biased by the spring 4 to pivot in the clockwise direction such that the positioning section 32 is engaged in one of the positioning grooves 55. Under the action of the gravitational force on the backrest 1, the inner edge 551 and the upper edge 552 of the positioning groove 55 abut against the positioning section 32 of the positioning button 3 to prevent the positioning button 3 from further pivoting in the clockwise direction, fixing the backrest 1 in a desired height. In this case, the ridge 313 of the axle portion 31 presses against the rectilinear side 541 of the movement groove 54 to increase the positioning effect.

A lid 7 is mounted to an outer side of the positioning board 5 and includes mounting pegs 71 engaged in the mounting holes 58.

Figure 7:
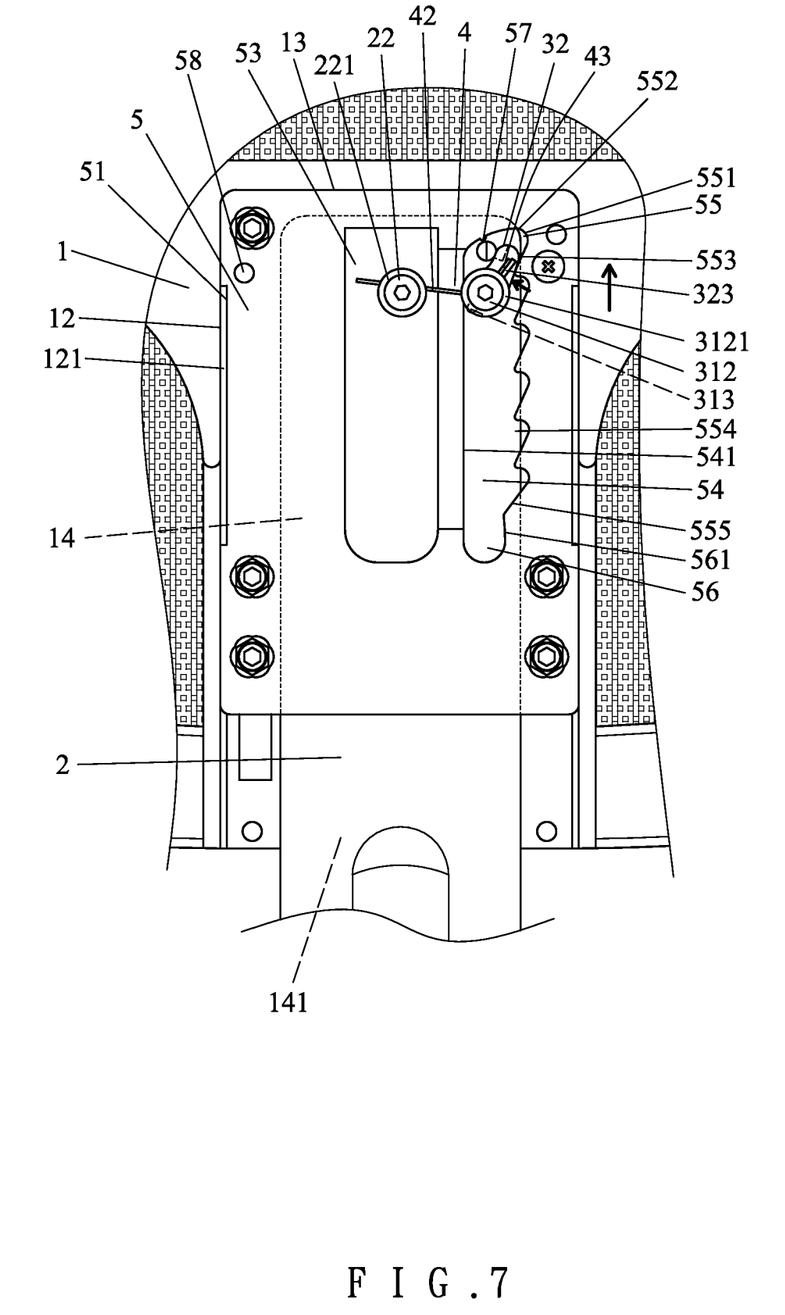
FIG. 7 is a view similar to FIG. 5, with the backrest moved upward, and with a positioning button pivoted and disengaged from the uppermost positioning groove.
Figure 8:
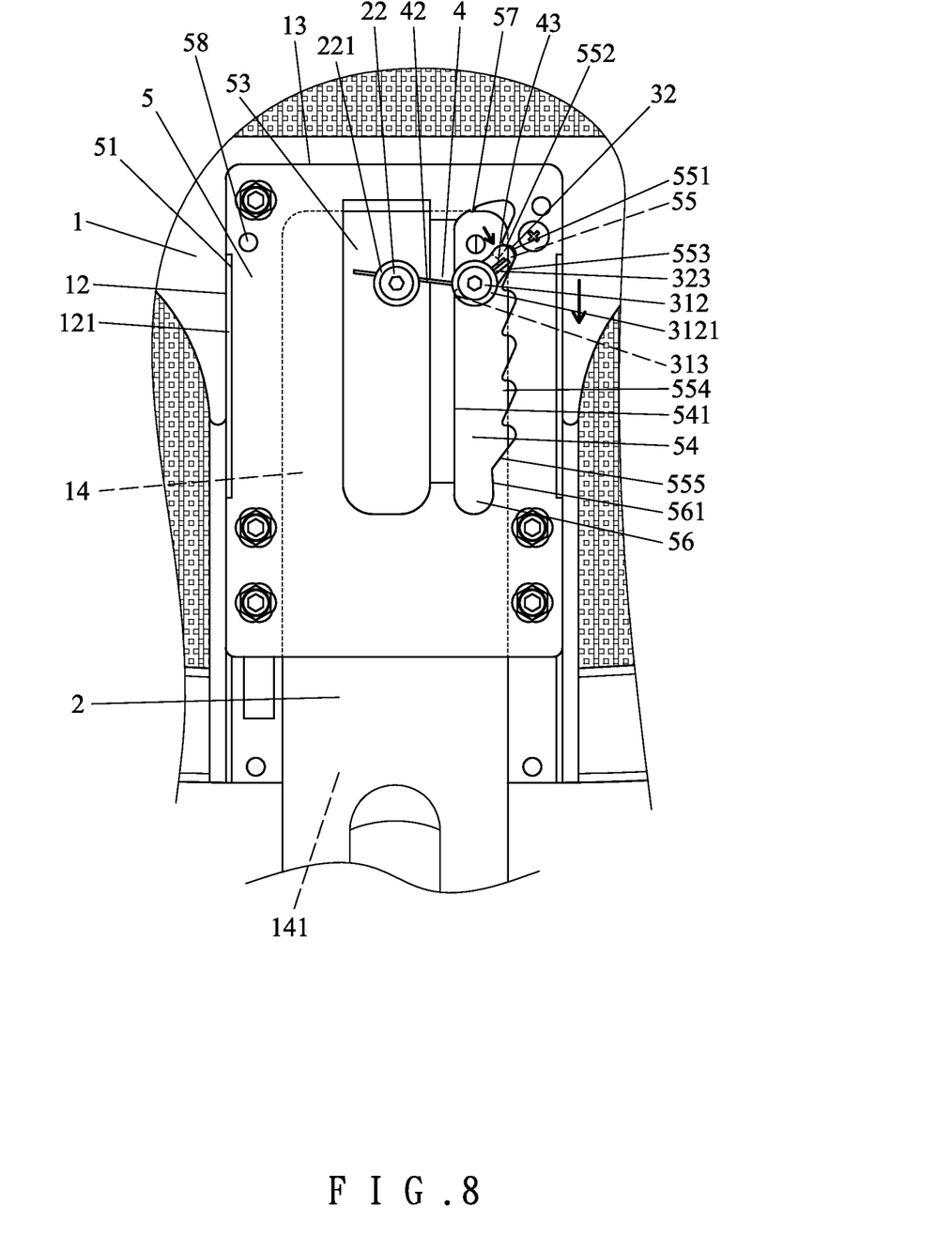
FIG. 8 is a view similar to FIG. 7, with the backrest further moved upward, and with the positioning button engaged in a lower positioning groove.

With reference to FIG. 7, when it is desired to adjust the height of the backrest 1, the backrest 1 is moved upward, the lower edge 553 of the positioning groove 55 receiving the positioning section 32 of the positioning button 3 presses against the positioning section 32 to pivot the positioning button 3 in the counterclockwise direction, allowing smooth upward movement of the backrest 1. With reference to FIG. 8, when the backrest 1 reaches the desired height, the positioning section 32 of the positioning button 3 pivots clockwise under the torsion of the spring 4 until the positioning section 32 aligns with the corresponding positioning groove 55. Under the action of the gravitational force of the backrest 1, the inner edge 551 and the upper edge 552 of the positioning groove 55 abut against the positioning section 32 of the positioning button 3, and the ridge 313 on the axle portion 31 presses against the rectilinear side 541 of the movement groove 54 to retain the backrest 1 in the desired height while providing an excellent positioning effect.

Figure 9:
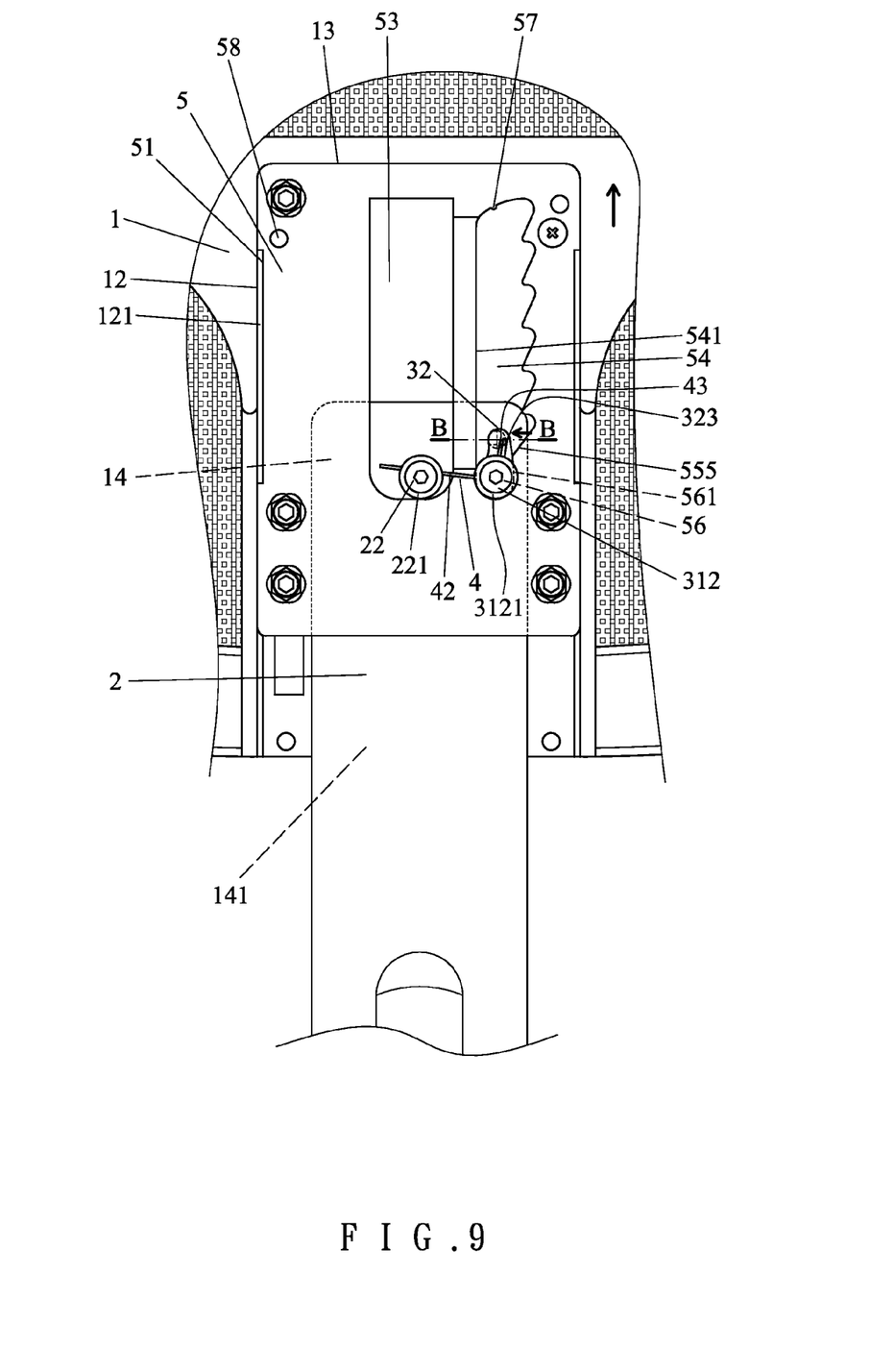
FIG. 9 is a view similar to FIG. 8, with the backrest moved to the uppermost position, and with the positioning button received in a transfer groove.
Figure 10:
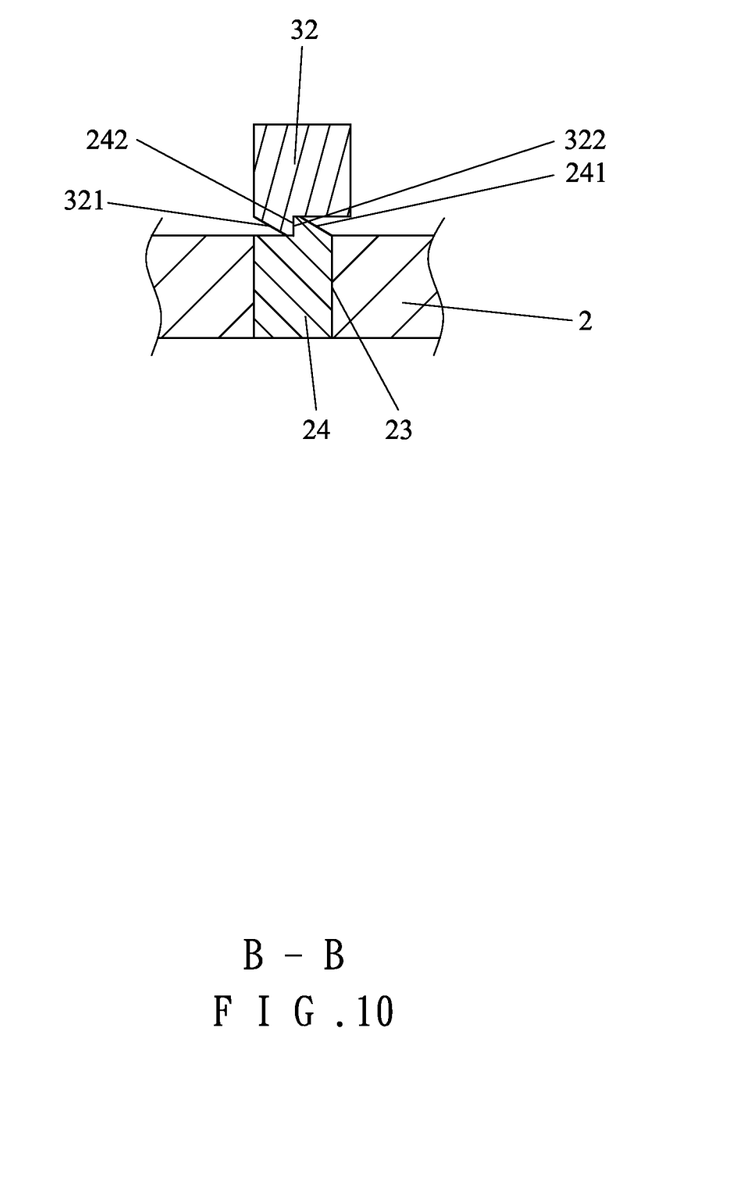
FIG. 10 is a cross sectional view taken along section line B-B of FIG. 9.
Figures 11, 11A:
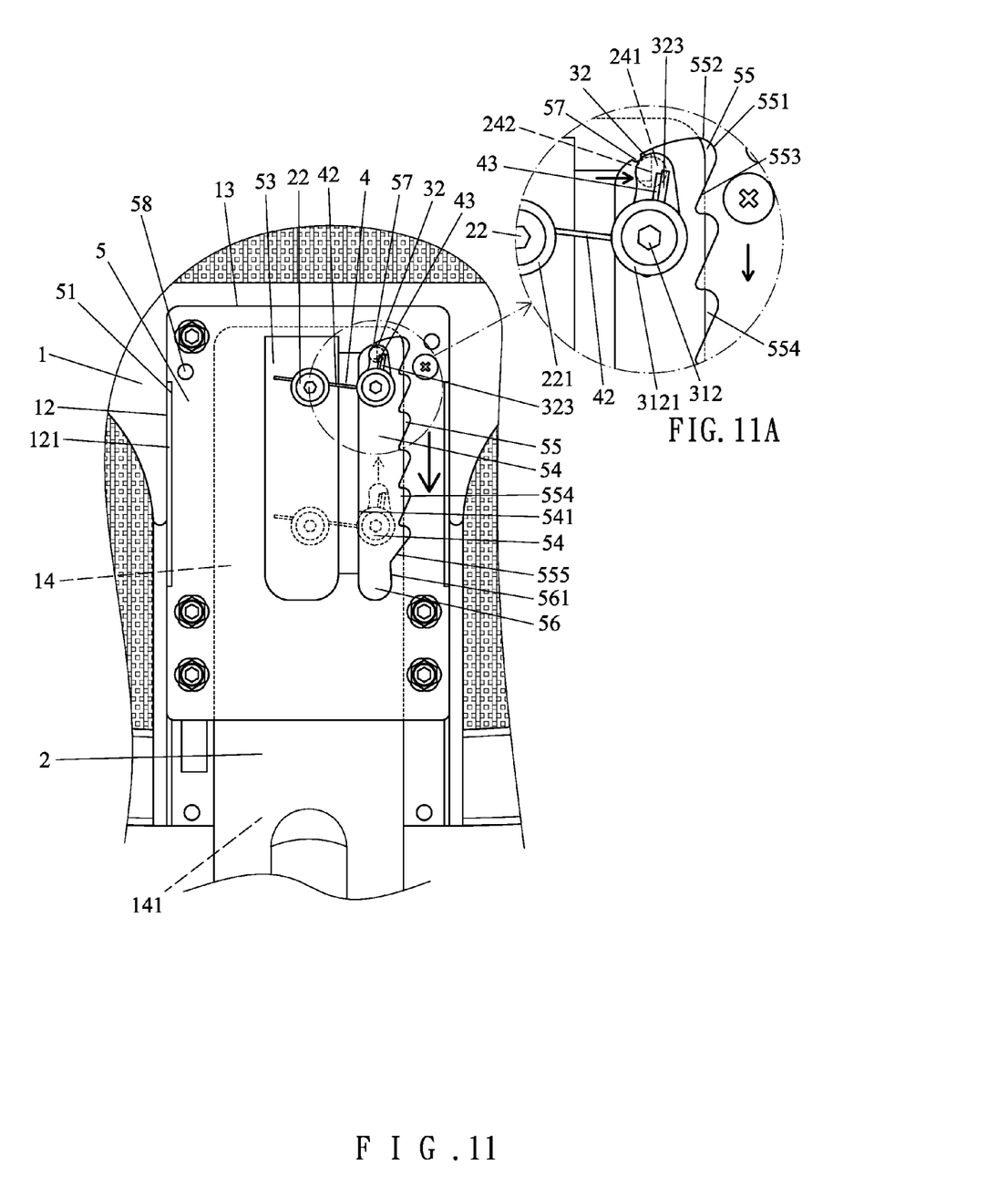
FIG. 11 is a view similar to FIG. 9, with the backrest moved downward, and with the positioning button pressing against an abutment protrusion.
FIG. 11A is an enlarged view of a circled portion of FIG. 5.

With reference to FIGS. 9-11, when it is desired to move the backrest 1 to a lower position, the backrest 1 is firstly moved to the highest position, with the extension 555 of the bottommost positioning groove 55 pressing against the positioning section 32 of the positioning button 3 to pivot the positioning button 3 in the counterclockwise direction, and the positioning button 3 is received in the transfer groove 56 below the movement groove 54. The positioning section 32 is guided by the rectilinear guiding section 561 such that the second stop face 322 of the positioning section 32 engages with the second stop face 242 of the attachment member 24 to limit the positioning section 32 in the vertical direction not aligned with the direction of the positioning grooves 55. In this case, the backrest 1 can be moved downward, as shown in FIG. 11. Under the action of the gravitational force on the backrest 1, the abutment protrusion 57 of the movement groove 54 presses against the top end of the positioning section 32 of the positioning button 3 to disengage the second stop face 322 of the abutment section 32 of the positioning button 3 from the first stop face 242 of the abutment member 24. Thus, the positioning section 32 pivots clockwise under the torsion of the spring 4 and engages with the topmost positioning groove 55, as shown in FIG. 5. Thus, the height-adjustable backrest assembly according to the present invention can be operated conveniently and possesses operational stability.

In view of the foregoing, the height-adjustable backrest assembly according to the present invention provides operational convenience and possesses operational stability. Note that the first tang 42 of the spring 4 can directly be fixed to the connecting member 2 without using the attachment peg 22. Furthermore, the attachment member 24 can directly be formed on the connecting member 2.

Although specific embodiments have been illustrated and described, numerous modifications and variations are still possible without departing from the scope of the invention. The scope of the invention is limited by the accompanying claims.

The invention claimed is:

1. A height-adjustable backrest assembly comprising:
a backrest including a rear side having a coupling groove, with the coupling groove including an opening in a lower end thereof;
a connecting member including an upper end coupled to the backrest, with the connecting member further including a lower end adapted to be coupled to a seat or a base, with the upper end of the connecting member received in the coupling groove of the backrest, with the connecting member further including a rear surface, with an abutment member provided on the rear surface of the connecting member, with the abutment member including an end having an outer side, with the abutment member including a first inclined guiding face protruding from the outer side towards a center of the end of the abutment member, with the end of the abutment member further including a first stop face at a side thereof, and with the first inclined guiding face and the first stop face extending beyond the rear surface of the connecting member;
a positioning button pivotably mounted to the rear surface of the connecting member, with the positioning button including an axle portion having an axle hole, with a pivot extending through the axle hole and pivotably connected to the connecting member, with a positioning section protruding from the axle portion and including a second inclined guiding face and a second stop face, and with the axle portion further including a mounting section through which the axle hole extends;
a spring including first and second tangs and a coil portion between the first and second tangs, with the coil portion mounted to the mounting section of the positioning button, with the pivot extending through the coil portion of the spring and connected to the connecting member, with the first tang abutting against the connecting member, and with the second tang abutting against the positioning button; and
a positioning board mounted in a location outside of the coupling groove of the backrest, with the connecting member securely received in the coupling groove of the backrest and securely sandwiched between the backrest and the positioning board, with the positioning board including a movement groove extending in a vertical direction, with the movement groove including a rectilinear side corresponding to the axle portion of the positioning button, with the positioning board further including a plurality of positioning grooves spaced from each other in the vertical direction, with the positioning section of the positioning button releasably engaged in one of the plurality of positioning grooves, with each of the plurality of positioning grooves including an upper edge, a lower edge located below the upper edge in the vertical direction, and an inner edge between the upper edge and the lower edge, with the spring biasing the positioning button to pivot relative to the plurality of positioning grooves of the positioning board, with the positioning section of the positioning button abutting the inner edge of one of the plurality of positioning grooves, with an opening between the upper edge and the lower edge of each of the plurality of positioning grooves having a width larger than a width of the positioning section of the positioning button to provide room allowing movement of the positioning button, with the positioning section of the positioning button abutting the lower edge of one of the plurality of positioning grooves when the backrest is moved to adjust a height of the backrest relative to the connecting member, with a bottommost one of the plurality of positioning grooves including an extension extending from the lower edge thereof, with the positioning board further including a transfer groove formed below the bottommost one of the plurality of positioning grooves, with the transfer groove receiving the positioning button when the positioning section of the positioning button disengages from the plurality of positioning grooves, with the transfer groove including a first side connected to the rectilinear side of the movement groove, with the transfer groove further including a second side having a rectilinear guiding section connected to the extension of the bottommost one of the plurality of positioning grooves, with the positioning section of the positioning button guided by the rectilinear guiding section of the transfer groove while the positioning button is moving into the transfer groove, with the second inclined guiding face of the positioning button sliding along the first inclined guiding face of the abutment member, with the second stop face of the positioning button abutting against the first stop face of the abutment member to limit the positioning section of the positioning button in a position not aligned with the plurality of positioning grooves, with the movement groove further including a top end having an abutment protrusion, with the positioning section of the positioning button including a top end, and with the abutment section of the positioning button disengaging from the abutment member when the abutment protrusion of the movement groove presses against the top end of the positioning section of the positioning button.

2. The height-adjustable backrest assembly as claimed in claim 1, with the axle portion of the positioning button including a ridge, and with the ridge pressing against the rectilinear edge of the movement groove when the positioning section of the positioning button is received in one of the plurality of positioning grooves.

3. The height-adjustable backrest assembly as claimed in claim 1, with the rear side of the backrest including a recessed portion having two lateral walls, a bottom wall extending perpendicularly to and extending between the two lateral walls, and an upper wall extending perpendicularly to the bottom wall and the two lateral walls and extending between the two lateral walls, with the coupling groove defined in the bottom wall of the recessed portion, forming two ledges on opposite sides of the coupling groove, with each of the two ledges having a plurality of fixing holes, with the positioning board received in the recessed portion of the backrest and having a plurality of fixing holes aligned with the plurality of fixing holes of the backrest, and with a plurality of fasteners extending through the plurality of fixing holes of the positioning board and the plurality of fixing holes of the backrest to securely fix the connecting member in the coupling groove of the backrest.

4. The height-adjustable backrest assembly as claimed in claim 3, with each of the two lateral walls of the recessed portion of the backrest including a rib, with the positioning board including a notch in each of two lateral sides thereof, and with the ribs of the backrest engaged in the notches of the positioning board.

5. The height-adjustable backrest assembly as claimed in claim 1, with the pivot including an enlarged head abutting the coil portion of the spring, with an attachment peg provided on the rear surface of the connecting member, with the attachment peg including an enlarged section, with the first tang of the spring abutting against the attachment peg of the connecting member, with the enlarged section of the attachment peg preventing the first tang of the spring from disengaging from the attachment peg, with the positioning section having an attachment block, with the second tang of the spring abutting against the attachment block of the positioning button, with the positioning board further including a slot extending in the vertical direction, and with the slot receiving the attachment peg.

6. The height-adjustable backrest assembly as claimed in claim 1, further comprising: a lid including a plurality of mounting pegs, with the positioning board further including a plurality of mounting holes, with the lid mounted to an outer side of the positioning board, and with the mounting pegs received in the mounting holes.

* * * * *